US012750550B2

(12) United States Patent
Yamashita

(10) Patent No.: US 12,750,550 B2
(45) Date of Patent: Sep. 29, 2026

(54) STORAGE, VIDEO RECORDING SYSTEM, AND METHOD FOR CONTROLLING STORAGE

(71) Applicant: Panasonic Intellectual Property Management Co., Ltd., Osaka (JP)

(72) Inventor: Hideaki Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 118 days.

(21) Appl. No.: 18/863,855

(22) PCT Filed: Apr. 26, 2023

(86) PCT No.: PCT/JP2023/016483
§ 371 (c)(1),
(2) Date: Nov. 7, 2024

(87) PCT Pub. No.: WO2023/218967
PCT Pub. Date: Nov. 16, 2023

(65) Prior Publication Data
US 2026/0197520 A1 Jul. 9, 2026

(30) Foreign Application Priority Data
May 11, 2022 (JP) ................................. 2022-078012

(51) Int. Cl.
*H04N 21/4147* (2011.01)
*G06F 11/10* (2006.01)
(Continued)

(52) U.S. Cl.
CPC ..... *H04N 21/4334* (2013.01); *G06F 11/1076* (2013.01); *H04N 21/2662* (2013.01); *H04N 21/4147* (2013.01)

(58) Field of Classification Search
CPC .. H04N 21/4334; G11B 20/12; G11B 27/034; G11B 2220/2562; G11B 20/10;
(Continued)

(56) References Cited

U.S. PATENT DOCUMENTS 12,572,421 B2 * 3/2026 Engel .................. G06F 11/1076
2011/0271032 A1 11/2011 Yamada et al.
(Continued)

FOREIGN PATENT DOCUMENTS

JP 6-222986 8/1994
JP 10-40176 2/1998
(Continued)

OTHER PUBLICATIONS

International Search Report issued Jul. 4, 2023 in corresponding International Application No. PCT/JP2023/016483.
Decision to Grant a Patent issued Jul. 15, 2025 in corresponding Japanese Patent Application No. 2024-520378, with English-language translation.

*Primary Examiner* — Alazar Tilahun
(74) *Attorney, Agent, or Firm* — Wenderoth, Lind & Ponack, L.L.P.

(57) ABSTRACT

A storage comprises a flash memory having a recording area in which video is recorded, and a controller that controls recording of the video to the flash memory. In a case where a data recording maldistribution degree has reached or exceeded a first threshold value, the controller executes, as a standard function of the storage, a first wear-leveling process bringing the data recording maldistribution degree below the first threshold value. The controller acquires a second threshold value, which is a data recording maldistribution degree for preventing the data recording maldistribution degree from reaching the first threshold value while video is being recorded, and in a case where the data recording maldistribution degree is greater than the second threshold value, executes a second wear-leveling process
(Continued)

bringing the data recording maldistribution degree to or below the second threshold value.

10 Claims, 15 Drawing Sheets

(51) Int. Cl.
*H04N 21/2662* (2011.01)
*H04N 21/433* (2011.01)

(58) Field of Classification Search
CPC ........ G11B 20/10527; G11B 2220/455; G11B 27/10; G11B 19/02; G11B 7/007; G11B 2020/1277; G11B 2020/1062; G11B 2220/61; G11B 27/00; G11B 27/02; G06F 3/0616; G06F 3/0658; G06F 3/0679; G06F 3/0659; G06F 12/06; G06F 2212/1036; G06F 2212/7211
See application file for complete search history.

(56) References Cited

U.S. PATENT DOCUMENTS

| | | | | |
|---|---|---|---|---|
| 2014/0379971 | A1 | 12/2014 | Putro | |
| 2017/0300423 | A1* | 10/2017 | Kamruzzaman ... | G11C 16/3495 |
| 2017/0337106 | A1* | 11/2017 | Yen ........................ | G11C 29/52 |
| 2021/0019058 | A1* | 1/2021 | Zhu ..................... | G06F 12/0246 |
| 2021/0081136 | A1* | 3/2021 | Nakanishi ............... | G06F 12/16 |
| 2021/0195032 | A1 | 6/2021 | Oyoshi | |
| 2025/0060884 | A1* | 2/2025 | Bi ......................... | G06F 3/0679 |

FOREIGN PATENT DOCUMENTS

| | | |
|---|---|---|
| JP | 2004-079140 | 3/2004 |
| JP | 2013-191150 | 9/2013 |
| JP | 2021-99642 | 7/2021 |
| WO | 2011/013351 | 2/2011 |

* cited by examiner

TA

| LOGICAL ADDRESS | PHYSICAL ADDRESS |
|---|---|
| 0001 | 0001 |
| 0002 | 0003 |
| 0003 | 0002 |
| ⋮ | ⋮ |

TA

| LOGICAL ADDRESS | PHYSICAL ADDRESS |
|---|---|
| 0001 | 0001 |
| 0002 | 0003 |
| 0003 | 0002 |
| ⋮ | ⋮ |
| 0121 | 00AA |
| 0124 | 00AB |

TA

| LOGICAL ADDRESS | PHYSICAL ADDRESS |
|---|---|
| 0001 | 0001 |
| 0002 | 0003 |
| 0003 | 0002 |
| ⋮ | ⋮ |
| 0121 | 00AA |
| 0124 | 00F2 |

FIG. 12

TA

| LOGICAL ADDRESS | PHYSICAL ADDRESS |
|---|---|
| 0001 | 0001 |
| 0002 | 0003 |
| 0003 | 0002 |
| ⋮ | ⋮ |
| 0121 | 00AA |
| 0001 | 00AB |

FIG. 13

TA

| LOGICAL ADDRESS | PHYSICAL ADDRESS |
|---|---|
| 0001 | 00F2 |
| 0002 | 0003 |
| 0003 | 0002 |
| ⋮ | ⋮ |
| 0121 | 00AA |

FIG. 15

STORAGE, VIDEO RECORDING SYSTEM, AND METHOD FOR CONTROLLING STORAGE

TECHNICAL FIELD

The present disclosure relates to a storage that is configured to record video, a video recording system that is configured to record video in a storage, and a method of controlling a storage that is configured to record video.

BACKGROUND ART

Systems are known in which video acquired by a camera or other video detection device is received as an input and the video is recorded in a storage. The video, which is recorded in an external storage, is used for, e.g., future playback or video editing. In this system, a storage referred to as a solid-state drive (SSD) can be used.

The SSD has, as a data recording area, a semiconductor device referred to as a NAND flash memory. The NAND flash memory comprises numerous memory elements, and data (bit data) is recorded in the memory elements. The memory elements in the NAND flash memory have, in their nature, an upper limit for a data recording instance count. If the recording instance count in a specific memory element in the NAND flash memory reaches the upper limit and the specific memory element can no longer operate normally, the effect thereof could influence the entire NAND flash memory.

In order to solve the abovementioned problem, a process referred to as a "wear-leveling process" is executed in the SSD to avoid the occurrence of unbalanced recording of data in specific memory elements. The wear-leveling process is a process to reduce a difference between a highest value and a lowest value of the recording instance counts for the memory elements, by "changing arrangement" of the data recorded in the NAND flash memory.

However, if the wear-leveling process occurs during reading of data from the SSD or during recording of data to the SSD, the reading or recording of the data could be delayed. Thus, it is known to disable the wear-leveling process during reading of data (for example, refer to Patent Document 1).

PRIOR-ART DOCUMENTS

Patent Documents

[Patent Document 1] Japanese Laid-open Patent Publication No. 2013-191150

DISCLOSURE OF THE INVENTION

Problems the Invention is Intended to Solve

Even in recording of video to a SSD, the video must be recorded in the SSD without interruption because, if recording of video is interrupted, part of the video could become lost, and the quality of the recorded video could fall below that of the original video. Therefore, even in recording of video to a SSD, it is necessary to prevent interruption due to a wear-leveling process.

An object of the present disclosure is to provide a storage having a flash memory as a recording area for video, wherein a wear-leveling process is suppressed from being executed while video is being recorded, and the video is recorded in the recording area of the flash memory without interruption.

Means for Solving the Problems

The storage according to the present disclosure is configured to record video, the storage comprises a flash memory and a controller. The flash memory has a recording area in which video is recorded. The controller is configured to control recording of the video to the flash memory.

The recording area is divided into a plurality of blocks, which are units of data deletion. The controller executes, as a standard function of the storage, a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which video can be recorded from among the plurality of blocks and a lowest value among the recording instance counts for all of the plurality of blocks. The controller also acquires a second threshold value, which is a data recording maldistribution degree for preventing the data recording maldistribution degree from reaching the first threshold value while video is being recorded. In a case where the data recording maldistribution degree is greater than the second threshold value, the controller executes a second wear-leveling process bringing the data recording maldistribution degree to or below the second threshold value.

Effects of the Invention

In the storage according to the present disclosure, the first wear-leveling process, which is executed as a standard function of the storage, can be prevented from being executed while video is being recorded, by executing the second wear-leveling process to bring the data recording maldistribution degree to or below the second threshold value. As a result, video can be recorded in the recording area of the flash memory without interruption.

BRIEF DESCRIPTION OF THE DRAWINGS

FIG. 12 is a diagram showing an example of the address allocation table after the second wear-leveling process;

FIG. 13 is a diagram showing another example of the address allocation table before the second wear-leveling process;

FIG. 15 is a diagram showing another example of the address allocation table after the second wear-leveling process;

EMBODIMENT FOR CARRYING OUT THE INVENTION

Embodiments are described in detail below with reference to the accompanying drawings. However, there are cases where no detailed description beyond what is necessary is given. For example, there are cases where matters that are already well known or substantially identical configurations are not repetitively described. This prevents the descriptions below from becoming unnecessarily redundant and facilitates understanding by persons skilled in the art. The inventors have provided the descriptions below and the accompanying drawings in order to enable persons skilled in the art to adequately understand the present disclosure, but in no way intend for the scope of the claims to be limited thereby.

In the present disclosure, "video" refers to data that includes moving-image data and audio data, data that includes only moving-image data, or data that includes still-image data. "Recording" data refers to changing data content and includes not only writing of data but also deletion of data.

[1. Video Recording System]

Figure 1:
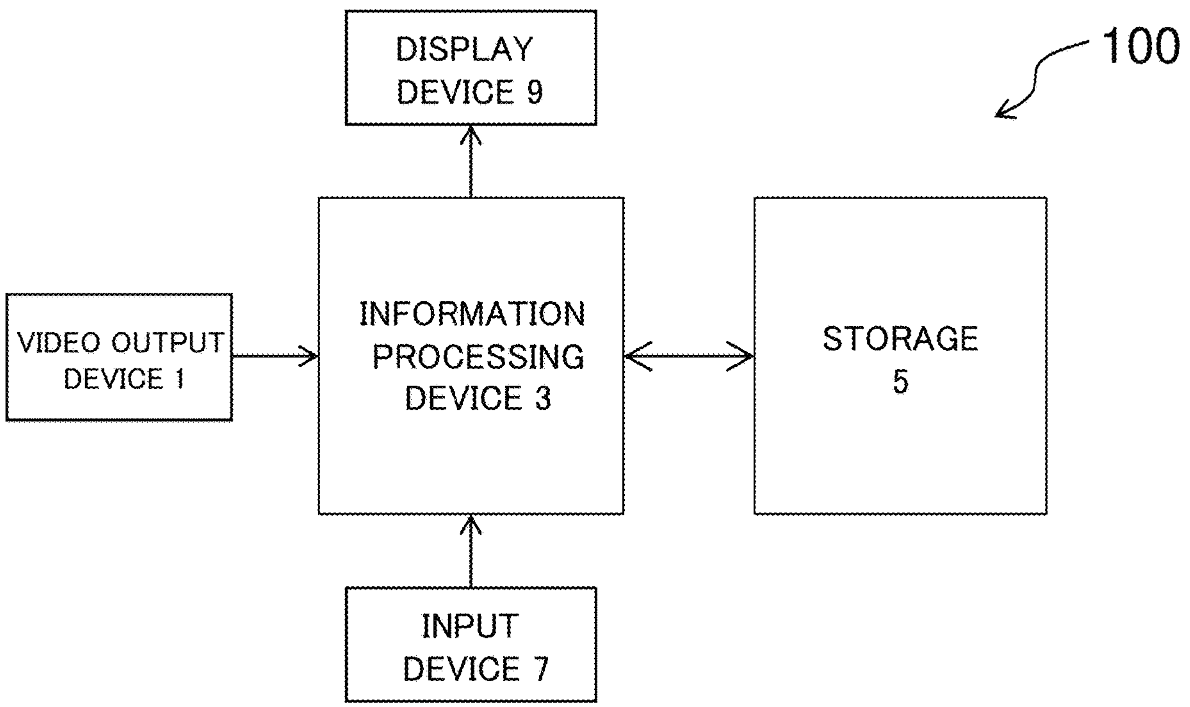
FIG. 1 is a diagram showing the configuration of a video recording system.

A video recording system 100 according to the present disclosure is described below with reference to the accompanying drawings. The video recording system 100 is a system that stores, in a storage 5, video acquired by a video output device 1. The configuration of the video recording system 100 is described using FIG. 1. FIG. 1 is a diagram showing the configuration of the video recording system 100. The video recording system 100 comprises the video output device 1, an information processing device 3, and the storage 5.

The video output device 1 outputs video to outside. The video output device 1 is a video capturing device provided with, e.g., a camera that captures prescribed video, a microphone that acquires audio of the prescribed video, and the like. The video output device 1 may instead be, e.g., a media server in which numerous videos are recorded or a reception device that acquires video sent via radio waves or other signals. The video acquired by the video output device 1 is, e.g., uncompressed 4K video or another form of high-quality video. In the example shown in FIG. 1, only one video output device 1 is provided, but the present disclosure is not limited to this example. The video recording system 100 may comprise a plurality of video output devices 1.

The information processing device 3 is connected to the video output device 1 and the storage 5. The information processing device 3 records, in the storage 5, the video inputted from the video output device 1. The information processing device 3 can use the video recorded in the storage 5 for editing or playing back video in the future.

The information processing device 3 can, e.g., edit the video inputted from the video output device 1 and send the edited video to an external device (not shown). To edit the video, the information processing device 3 can, e.g., insert a specific portion of past video stored in the storage 5 into the video inputted from the video output device 1 to generate new video.

The information processing device 3 is connected to an input device 7. The input device 7 receives an input from a user and transmits the input to the information processing device. The input device 7 is, e.g., a video editing console, a keyboard, a mouse, a touch panel, or the like.

The information processing device 3 is connected to a display device 9. The display device 9 displays the video edited by the information processing device 3 and video read for playback from the storage 5. The display device 9 is, e.g., a liquid crystal display, an organic EL display, a plasma display, or another type of display device.

The information processing device 3, the input device 7, and/or the display device 9 may all be configured as one device or may each be configured as separate devices.

The storage 5 is a device that records video. The storage 5 has, as a data recording area, a flash memory that is a semiconductor non-volatile memory. The storage 5 is a solid-state drive (SSD).

In the example of the video recording system 100 shown in FIG. 1, the video output device 1, the information processing device 3, and the storage 5 are configured as separate devices. However, the present disclosure is not limited to this example; the information processing device 3 and the storage 5 may be disposed in one housing and constitute one device. Additionally, the video output device 1 and the information processing device 3 may be disposed in one housing and constitute one device. Furthermore, the video output device 1, the information processing device 3, and the storage 5 may be disposed in one housing, and the video recording system 100 may be configured as one device.

[2. Information Processing Device]

Figure 2:
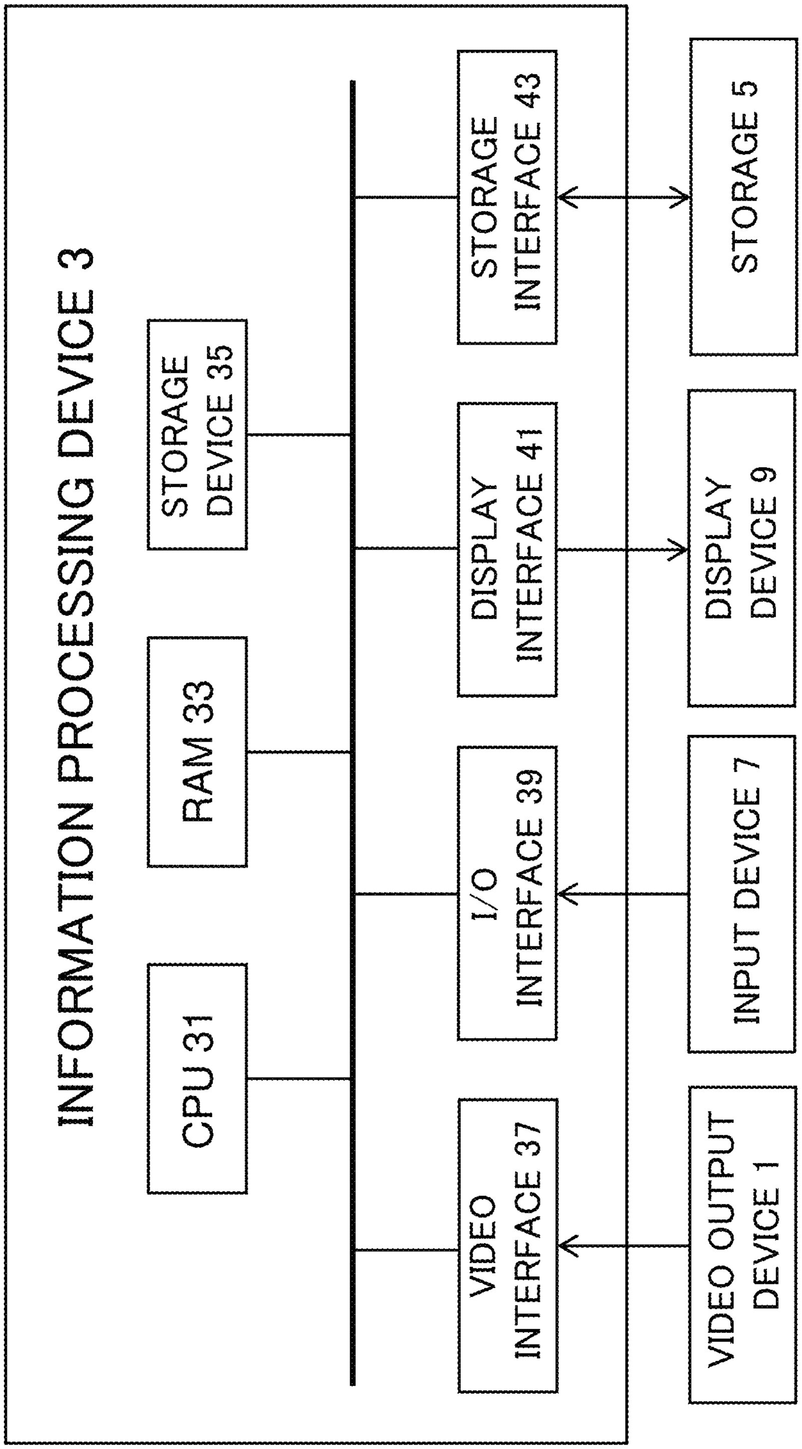
FIG. 2 is a diagram showing the configuration of an information processing device.

The configuration of the information processing device 3 is described using FIG. 2. FIG. 2 is a diagram showing the configuration of the information processing device 3. The information processing device 3 has a CPU 31, a RAM 33, a storage device 35, and various interfaces.

The CPU 31 executes various processes in the information processing device 3. Specifically, the CPU 31 executes an information process relating to video editing, a process relating to recording of the video inputted from the video output device 1 to the storage 5, and the like. The CPU 31 executes the various processes in accordance with commands indicated by a program stored in the storage device 35. Some of the processes may be realized using hardware mounted in the CPU 31. The CPU 31 generates instructions for executing the various processes.

The RAM 33 temporarily stores data or the like. The instructions generated by the CPU 31 are temporarily stored (queued) in the RAM 33. Data that is transmitted or received between the video output device 1 and the storage 5 is also temporarily stored in the RAM 33.

The storage device 35 includes a ROM, a hard disk (HDD), a solid-state drive (SSD), or the like. The storage device 35 stores the program executed by the CPU 31, settings relating to the processes of the information processing device 3, parameters used in the aforementioned processes, and the like.

The interfaces connect the information processing device 3 and other devices. Specifically, the interfaces include a video interface 37, an I/O interface 39, a display interface 41, and a storage interface 43.

The video output device 1 is connected to the video interface 37. The video interface 37 is an interface that conforms to the serial digital interface (SDI) standard or another type of interface for connecting video-related equipment. The input device 7 is connected to the I/O interface 39. The display device 9 is connected to the display interface 41.

The storage 5 is connected to the storage interface 43. The storage interface 43 is, e.g., a PCIe interface. This makes it possible for data or the like to be rapidly transmitted and received between the information processing device 3 and the storage 5 according to a solid-state-drive-dedicated protocol (non-volatile memory express (NVMe)).

[3. Storage]

Figure 3:
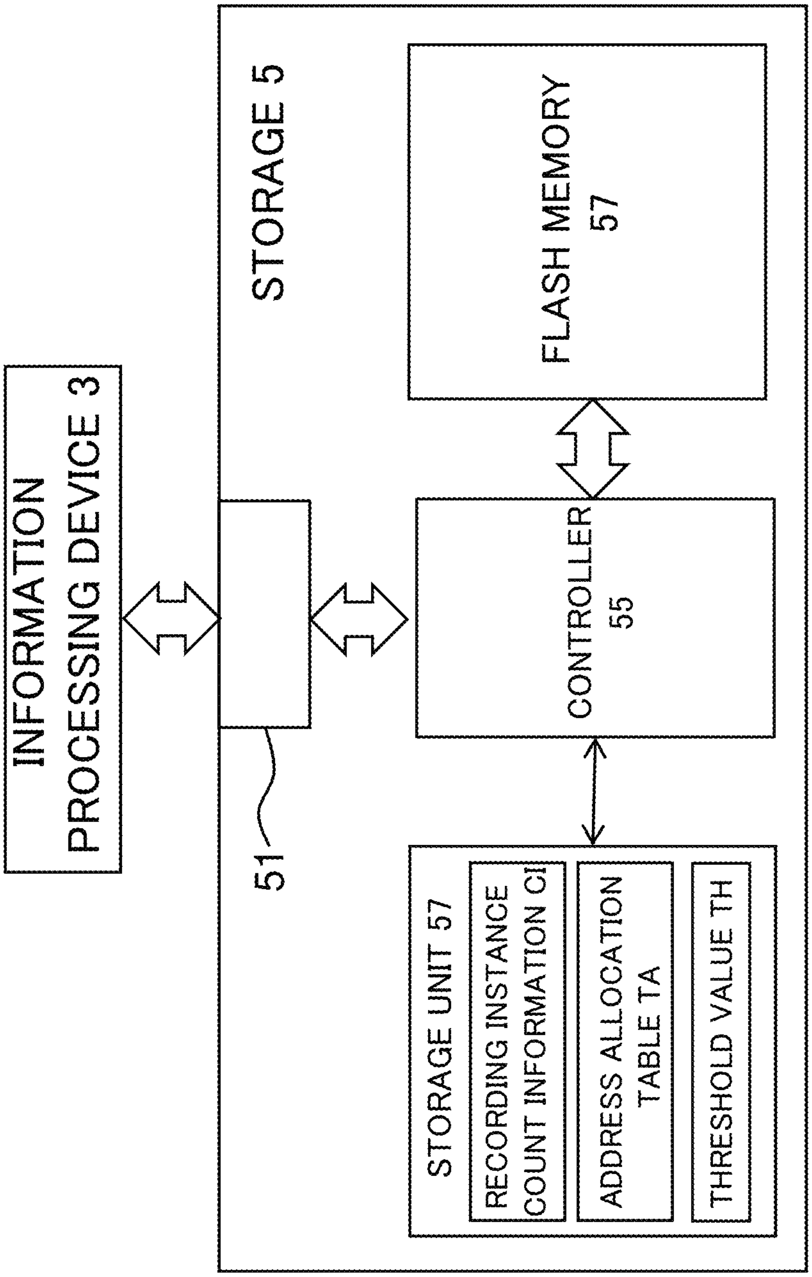
FIG. 3 is a diagram showing the configuration of a storage.

The configuration of the storage 5 is described using FIG. 3. FIG. 3 is a diagram showing the configuration of the storage 5. The storage 5 has an access port 51, a flash memory 53, a controller 55, and a storage unit 57. The access port 51 connects the information processing device 3 and the storage 5. A plurality of access ports 51 may be provided, and the information processing device 3 may be connected to one of the plurality of access ports 51.

Figures 4, 5:
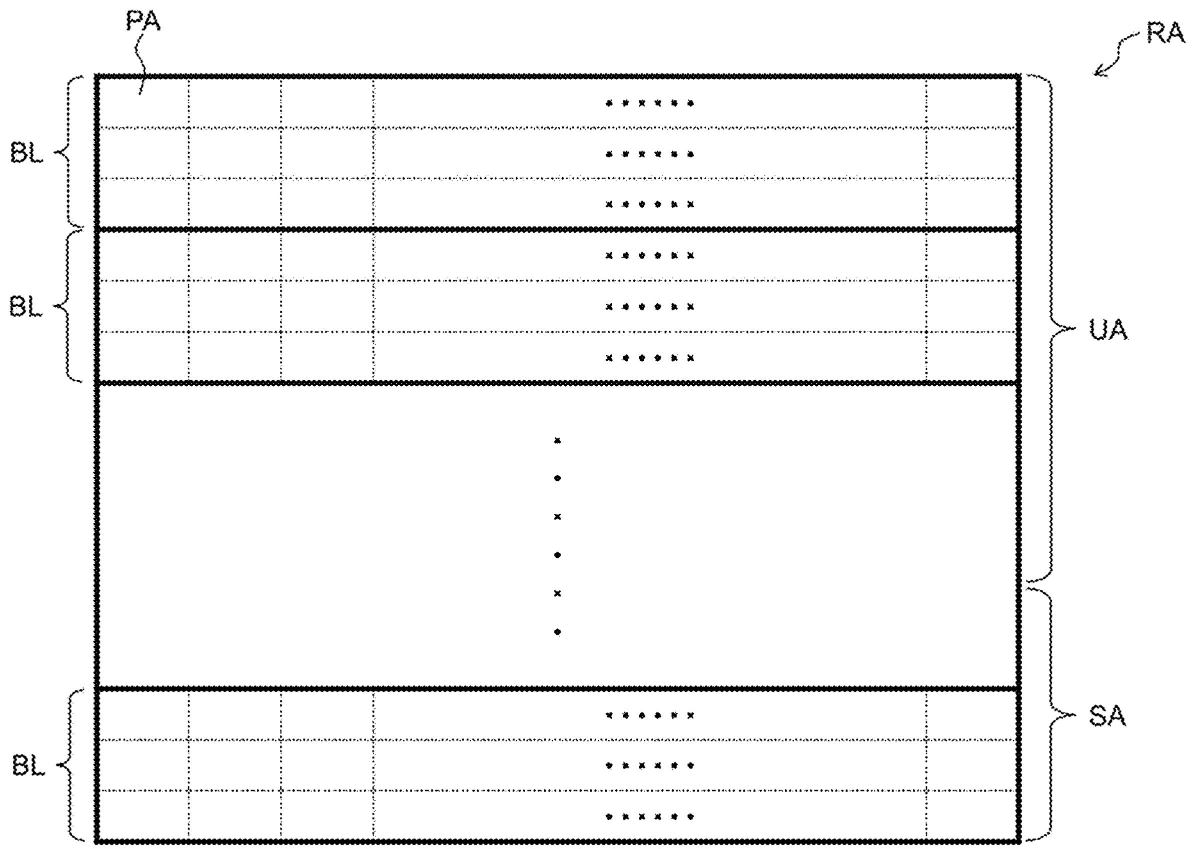
FIG. 4 is a diagram showing the configuration of a recording area.
FIG. 5 is a diagram showing an example of an address allocation table.

The flash memory 53 includes a plurality of NAND flash memories. The flash memory 53 has a recording area RA for recording video. As shown in FIG. 4, the recording area RA is divided into a plurality of blocks BL. FIG. 4 is a diagram showing the configuration of the recording area RA.

The blocks BL are referred to as deletion blocks and serve as units of data deletion. The blocks BL are furthermore divided into a plurality of pages PA. The pages PA are units of data writing. In the flash memory 53, when data of the blocks BL is deleted, the data included in the blocks BL is moved to another block BL and then deleted (garbage collection). This results in the blocks BL becoming "free blocks" to which data can be written.

The recording area RA includes a usable area UA and a spare area SA. The usable area UA includes blocks BL to which data can be recorded. The spare area SA is used for the purpose of backing up data included in the usable area UA through the wear-leveling process, garbage collection, or the like. The blocks BL included in the spare area SA are prohibited from recording data from the information processing device 3.

The controller 55 executes control over the storage 5. Specifically, the controller 55 controls recording of data to the flash memory 53 and reading of data from the flash memory 53. The controller 55 also executes wear-leveling and other processes that are necessary for solid-state drives. The controller 55 executes a program stored in the storage unit 57 to execute the aforementioned processes. The controller 55 may also realize the aforementioned processes using hardware of the controller 55.

The storage unit 57 is provided as a memory separate from the flash memory 53 or is part of the recording area RA, and stores various parameters relating to control of the storage 5. Specifically, the storage unit 57 stores recording instance count information CI, an address allocation table TA, and a threshold value TH.

The recording instance count information CI represents data recording instance counts for the blocks BL included in the recording area RA. In the address allocation table TA, addresses (logical addresses) designated by the external device and addresses (physical addresses) of the blocks BL corresponding to the logical addresses are associated with one another, as shown in FIG. 5. FIG. 5 is a diagram showing an example of the address allocation table TA. The controller 55 determines a logical address from an address designated by the external device and determines a physical address from the determined logical address, thus determining blocks BL to be accessed.

The threshold value TH represents a condition under which the wear-leveling process is executed. Specifically, the threshold value TH represents that the wear-leveling process is executed in a case where a data recording maldistribution degree is equal to or greater than the threshold value TH. In other words, a common wear-leveling process algorithm is used in a first wear-leveling process and a second wear-leveling process (described later), and a plurality of wear-leveling processes can be executed for different purposes merely by changing the threshold value TH in the storage unit 57.

The data recording maldistribution degree represents a degree of centralization of data recording in blocks BL in which data is frequently recorded. The data recording maldistribution degree is expressed as a difference between a highest value of the recording instance counts for blocks BL to which the video can be recorded among the plurality of blocks BL and a lowest value among the recording instance counts for all of the plurality of blocks BL. The blocks BL to which the video can be recorded are the blocks BL included in the usable area UA.

A default value for the threshold value TH is a first threshold value. Specifically, in cases where the data recording maldistribution degree is equal to or greater than the first threshold value, the controller 55 executes a wear-leveling process as a standard function of the storage 5. The wear-leveling process in this instance is referred to as the first wear-leveling process.

[4. Operation of Video Recording System]

[4-1. Operation of Information Processing Device]

Figure 6:
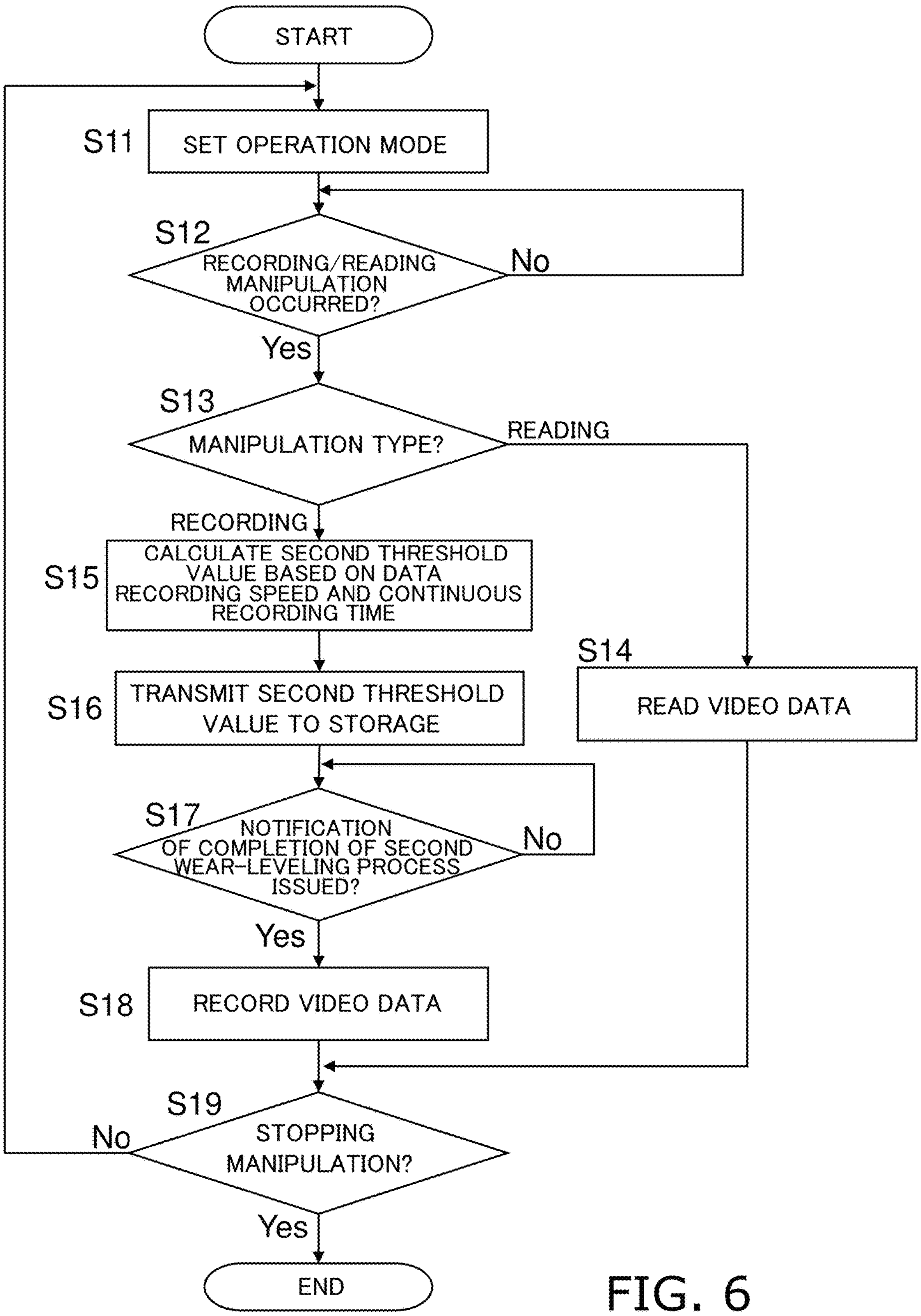
FIG. 6 is a flowchart showing an operation of the information processing device.
Figure 7:
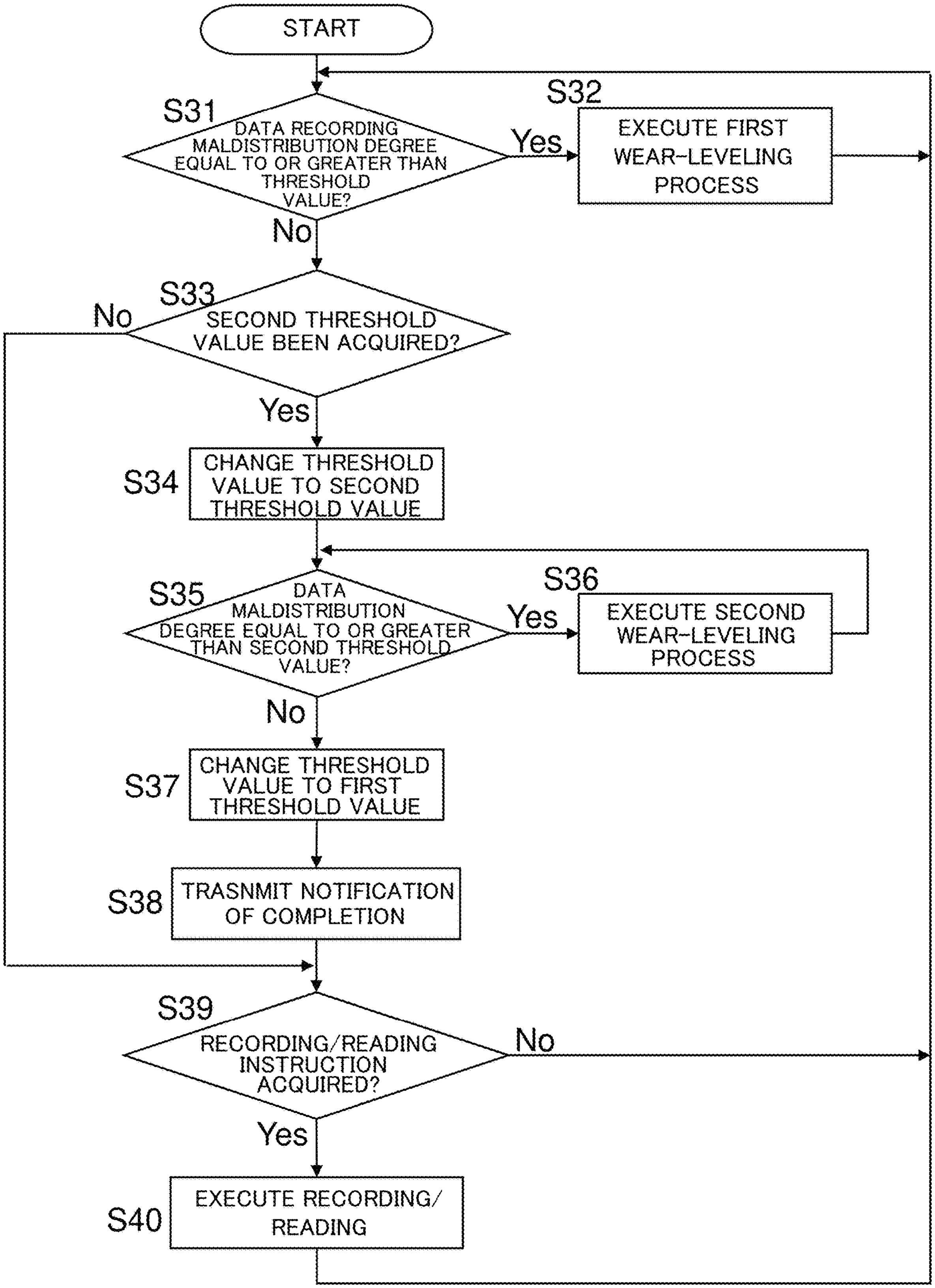
FIG. 7 is a flowchart showing an operation of the storage.
Figure 8:
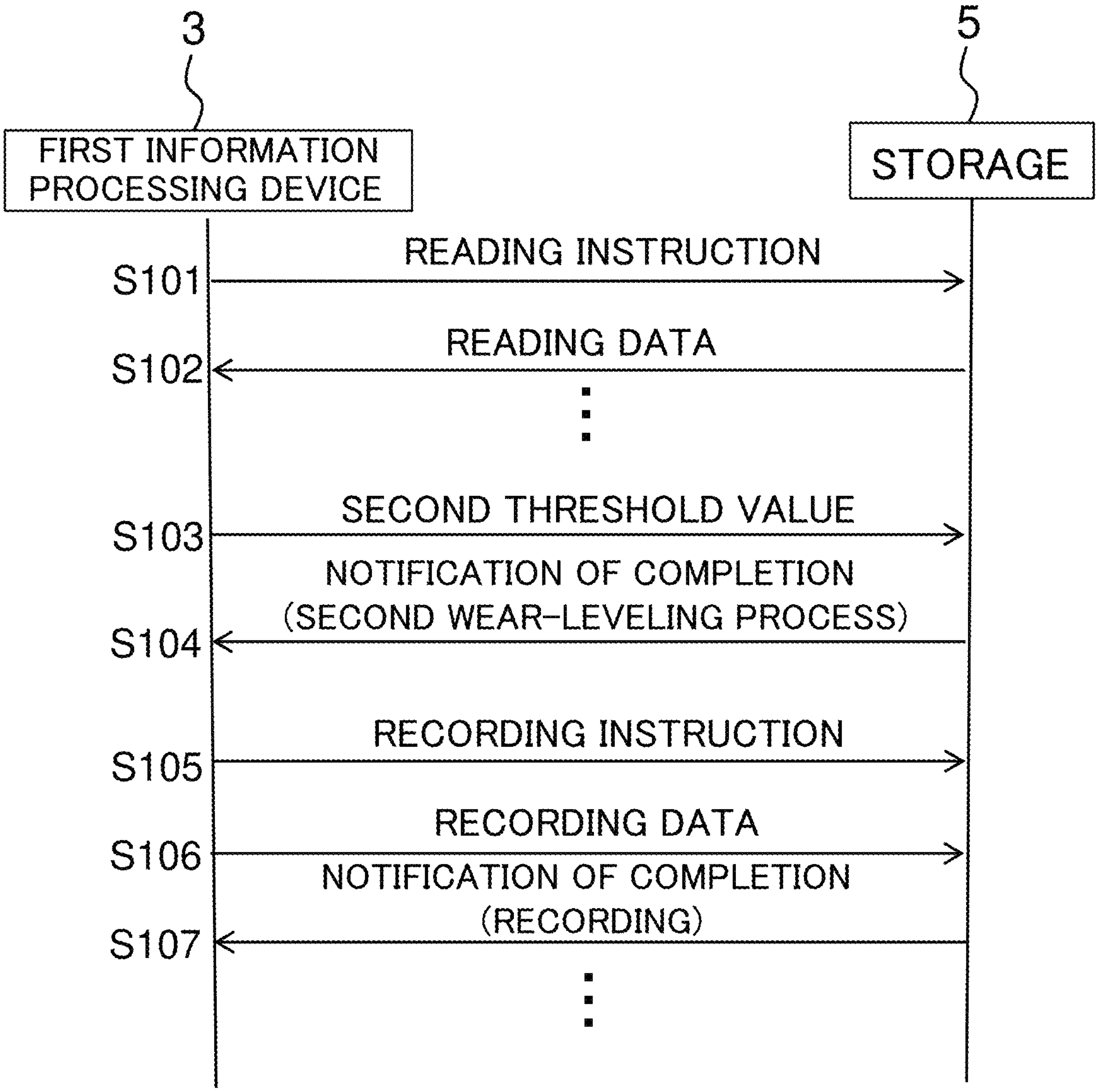
FIG. 8 is a diagram showing transmission/reception of signals during the operations.

Video reading/recording operations in the video recording system is described using FIGS. 6 to 8. FIG. 6 is a flowchart showing an operation of the information processing device 3. FIG. 7 is a flowchart showing an operation of the storage 5. FIG. 8 is a diagram showing transmission/reception of signals during the operation. First, the operation in the information processing device 3 is described using FIGS. 6 and 8.

When the video recording system 100 is started up, the video recording system 100 is initialized. Specifically, the controller 55 stores the first threshold value as the threshold value TH in the storage 5. This makes it possible for the first wear-leveling process to be executed as a standard function in the storage 5. Additionally, other initialization (e.g., clearing of a buffer memory) may be executed in the storage 5 and prescribed initialization may be executed in the information processing device 3, as necessary.

After the video recording system 100 is initialized, in step S11 shown in FIG. 6, a user sets an operation mode of the video recording system 100 using the input device 7. The operation mode represents the quality of the video used in the video recording system 100. The operation mode includes, e.g., a number of pixels per frame of the video used in the video recording system 100, a number of frames per unit time (e.g., frames per second (fps)), a permissible range for reduction in speed in video recording/reading, and other information.

In a case where the user has performed a manipulation using the input device 7 ("Yes" in step S12), the CPU 31 assesses whether the manipulation performed by the user is a reading manipulation or a recording manipulation (step S13). In cases where no manipulation performed using the input device 7 has occurred ("No" in step S12), the CPU 31 stands by to receive a manipulation from the input device 7.

In a case where the manipulation performed by the user is a reading manipulation ("Reading" in step S13), the CPU 31 generates a reading instruction, and the video is read from the storage 5 (step S14, step S101, step S102). A reading address for accessing the video to be read is included in the reading instruction. An operation for reading the video from the storage 5 shall be described in detail later.

However, in a case where the manipulation performed by the user is a recording manipulation ("Recording" in step S13), the CPU 31 calculates a second threshold value and stores the second threshold value in the RAM 33 (step S15). The second threshold value is a data recording maldistribution degree for preventing the data recording maldistribution degree from reaching the first threshold value while video to be recorded is being recorded. Specifically, the second threshold value is a data recording maldistribution degree for preventing the first wear-leveling process from being executed while the video to be recorded is being recorded.

Specifically, the CPU 31 calculates the second threshold value based on a recording speed at which the video to be recorded is recorded to the recording area RA and a required time that is necessary to record the video to the recording area. In the case of non-compressed recording, the recording speed is calculated as the product of the number of pixels per frame in the video to be recorded, the per-pixel bit depth and chroma sampling thereof, and the number of frames per unit time. These items of information being included in the operation mode. In the case of compressed recording, a data volume per unit time is reduced to, e.g., one-tenth of the original value. Specifically, the recording speed corresponds to the data volume per unit time of the video to be recorded, the recording speed being, e.g., a bit rate (bits per second, bps). The required time corresponds to a temporal length of the video to be recorded.

More specifically, the CPU 31 calculates a total data volume of the video to be recorded from the product of the recording speed and the required time and calculates the second threshold value based on the total data volume. Even more specifically, the CPU 31 can calculate the second threshold value such that the larger the total data volume is, the smaller the second threshold value becomes. This is because the likelihood that video will be recorded in a block BL having the highest recording instance count rises as the total data volume increases. Specifically, the likelihood that video will be recorded in the block BL having the highest recording instance count and the first wear-leveling process will be executed rises as the total data volume increases.

After the second threshold value is calculated, the second threshold value is transmitted from the RAM 33 to the storage 5 (step S16, step S103). A wear-leveling process (referred to as the second wear-leveling process) that brings the data recording maldistribution degree to or below the second threshold value is thereby executed on the storage 5 side. A specific operation in the second wear-leveling process is described in detail later.

After the second threshold value is transmitted, the CPU 31 of the information processing device 3 assesses whether a notification of completion of the second wear-leveling process has been issued from the storage 5 (step S17). Specifically, the CPU 31 assesses whether a notification of completion is stored in the RAM 33. In a case where no notification of completion has been issued ("No" in step S17), the CPU 31 stands by until a notification of completion is issued.

On the other hand, in a case where a notification of completion has been issued ("Yes" in step S17, step S104), the CPU 31 generates a recording instruction, acquires the video to be recorded from the video output device 1, and stores the recording instruction and the video to be recorded in the RAM 33, and consequently the video is recorded to the storage 5 (step S18, steps S105 to S107). A recording address for recording the video to be recorded is included in the recording instruction. An operation for recording the video to the storage 5 is described in greater detail later.

After the video is read/recorded, the CPU 31 assesses whether a manipulation for stopping the information processing device 3 has been performed from the input device 7 or the like (step S19). In a case where no stopping manipulation has been performed (provided that the response is "No" in step S19), the abovementioned steps S11 to S18 are repeatedly executed. On the other hand, in a case where a stopping manipulation has been performed ("Yes" in step S19), the information processing device 3 stops the operation.

[4-2. Operation of Storage]

Next, the operation of the storage 5 is described using FIGS. 7 and 8. First, in step S31, the controller 55 assesses whether a current data recording maldistribution degree is equal to or greater than the threshold value TH stored in the storage unit 57. Specifically, the controller 55 refers to the recording instance count information CI, calculates a difference between a highest value and a lowest value of the data recording instance counts for the plurality of blocks BL as the data recording maldistribution degree, and compares the calculated data recording maldistribution degree and the threshold value TH.

As described above, in an operation for initializing the video recording system 100, the threshold value TH is set as the first threshold value. Thus, the controller 55 assesses whether the current data recording maldistribution degree is equal to or greater than the first threshold value.

In a case where the current data recording maldistribution degree is equal to or greater than the first threshold value ("Yes" in step S31), the controller 55 executes the first wear-leveling process as a standard function of the storage 5 (step S32). The first wear-leveling process is repeatedly executed until the data recording maldistribution degree falls below the first threshold value.

On the other hand, in a case where the current data recording maldistribution degree is less than the first threshold value ("No" in step S31), the operation advances to step S33. In step S33, the controller 55 assesses whether a second threshold value can be acquired. Specifically, the controller 55 assesses whether the second threshold value is stored in the RAM 33 of the information processing device 3. In a case where no second threshold value is stored in the RAM 33 ("No" in step S33), the operation of the storage 5 advances to step S39. Specifically, if a data reading/recording instruction exists, reading/recording is executed.

On the other hand, in a case where the second threshold value is stored in the RAM 33 ("Yes" in step S33), the controller 55, in step S34, acquires the second threshold value from the RAM 33 (step S103) and rewrites the threshold value TH in the storage unit 57 from the first threshold value to the second threshold value.

Subsequently, in step S35, an assessment is made as to whether the current data recording maldistribution degree is greater than the second threshold value. In a case where the current data recording maldistribution degree is greater than the second threshold value ("Yes" in step S35), the controller 55 executes the second wear-leveling process (step S36). The second wear-leveling process is repeatedly executed until the data recording maldistribution degree falls to or below the second threshold value.

In a case where the second wear-leveling process has been executed and the current data recording maldistribution degree has been brought to or below the second threshold value or where the data recording maldistribution degree is equal to or less than the second threshold value despite the second wear-leveling process not being executed ("No" in step S35), the controller 55 rewrites the threshold value TH in the storage unit 57 from the second threshold value to the first threshold value (step S37). The controller 55 subsequently generates a notification of completion of the second wear-leveling process and transmits the notification of completion to the information processing device 3 (step S38, step S104). The transmitted notification of completion is stored in the RAM 33.

Thus, the first wear-leveling process can be executed as a standard function in the storage 5 in a state in which the data recording maldistribution degree is equal to or less than the second threshold value. As a result, the first wear-leveling process is prevented from being executed at least while video is being recorded. Since the wear-leveling process is not executed while video is being recorded, the video is recorded to the recording area RA without interruption.

In a case where a request for reading or recording of video is made by the information processing device 3 ("Yes" in step S39), the controller 55 of the storage 5 reads/records the video (step S40).

Reading of the video is executed as described below. First, the controller 55 of the storage 5 acquires the reading instruction stored in the RAM 33 of the information processing device 3 (step S101). Next, the controller 55 determines a logical address from the reading address included in the reading instruction. The controller 55 determines a physical address from the logical address with reference to the address allocation table TA. The controller 55 acquires video to be read from a page PA determined based on the physical address and transmits the acquired video to the RAM 33 (step S102).

Recording of the video is executed as described below. First, the controller 55 of the storage 5 acquires the recording instruction and video to be recorded that are stored in the RAM 33 of the information processing device 3 (steps S105 and S106). Next, the controller 55 determines a logical address from the recording address included in the recording instruction. The controller 55 determines a physical address from the logical address with reference to the address allocation table TA. The controller 55 records the video to be recorded to a page PA determined based on the physical address. In a case where recording of the video is successful, the controller 55 generates a notification of completion of the recording of the video and transmits the notification of completion to the information processing device 3 (step S107). The transmitted notification of completion is stored in the RAM 33. This makes it possible for the information processing device 3 to recognize that the video to be recorded has been recorded in a designated recording area RA.

[4-3. Second Wear-Leveling Process]

Figures 9, 10:
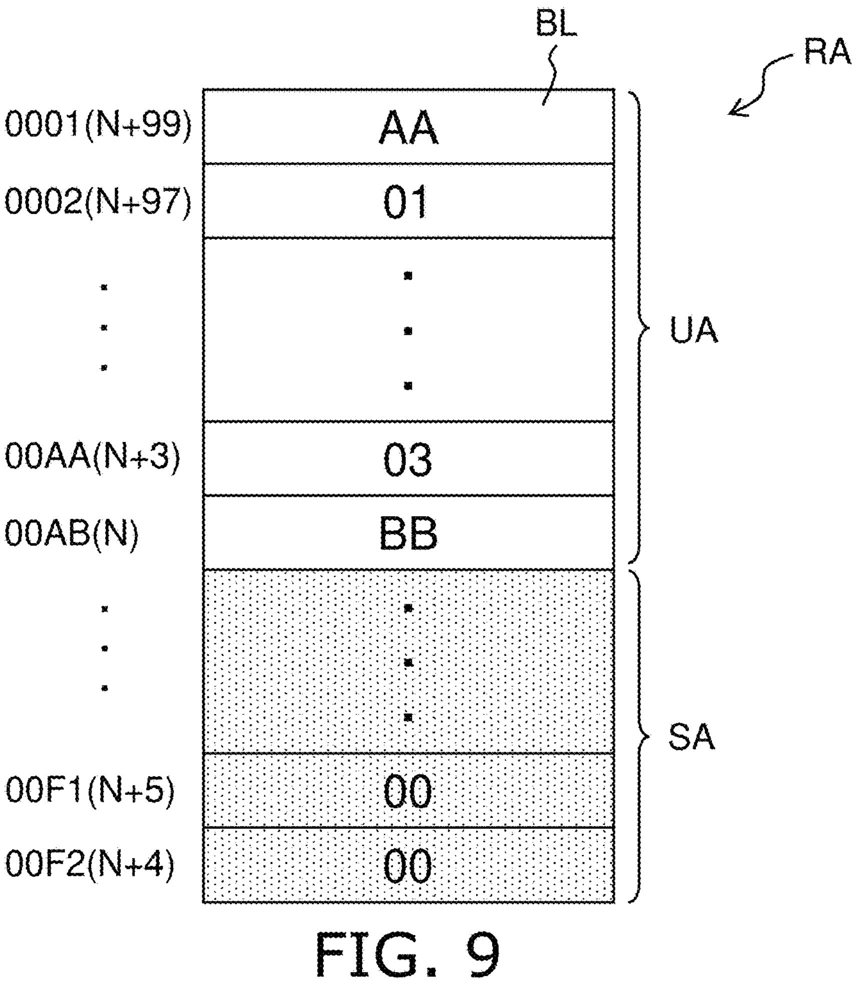
FIG. 9 is a diagram showing an example of the state of the recording area before a second wear-leveling process.
FIG. 10 is a diagram showing an example of the address allocation table before the second wear-leveling process.
Figure 11:
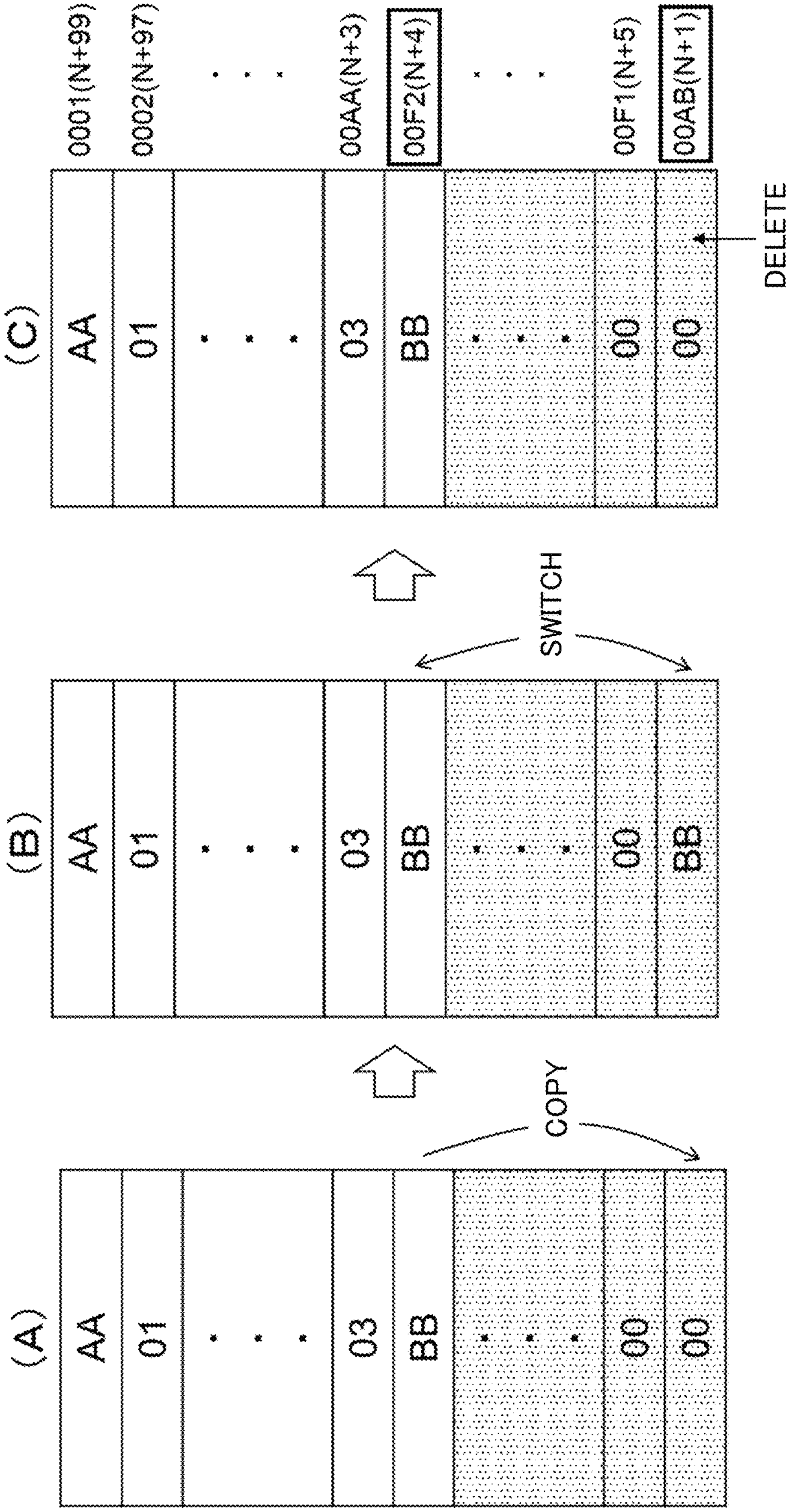
FIG. 11 is a diagram showing an example of a transition in the state of the recording area due to the second wear-leveling process.

The second wear-leveling process is described below using FIGS. 9 to 12. FIG. 9 is a diagram showing an example of the state of the recording area RA before the second wear-leveling process. FIG. 10 is a diagram showing an example of the address allocation table TA before the second wear-leveling process. FIG. 11 is a diagram showing an example of a transition in the state of the recording area RA due to the second wear-leveling process. FIG. 12 is a diagram showing an example of the address allocation table TA after the second wear-leveling process. In FIGS. 9 and 11, the spare area SA within the recording area RA is shown using hatching to facilitate understanding. The physical addresses and recording instance counts for the blocks BL are shown on the right or left side of the blocks BL in the format "physical address (recording instance count)." In FIGS. 10 and 12, only address allocation in the usable area UA within the address allocation table TA is shown.

In the description below, the first threshold value is 100, and the second threshold value is 98. This prevents the first wear-leveling process from being executed until, for example, data is recorded two times to the block BL having the highest recording instance count.

As shown in FIG. 9, before the second wear-leveling process, the highest value among the recording instance counts for the blocks BL included in the usable area UA is N+99, which is the recording instance count for the block BL at physical address "0001." The lowest value among the recording instance counts for all of the plurality of blocks BL is N, which is the recording instance count for the block BL at physical address "00AB." Specifically, the data recording maldistribution degree is 99.

The second wear-leveling process can be realized by "switching" the block BL having the lowest recording instance count within the usable area UA and the block BL having the lowest recording instance count within the spare area SA. Specifically, the second wear-leveling process can be realized by the following process. The controller 55 copies the data in the block BL at the physical address "00AB" within the usable area UA to the block BL at physical address "00F2," which has the lowest recording instance count (N+4), within the spare area SA (section (A) in FIG. 11).

When already-recorded data is deleted and new data is recorded, the recording instance count for the blocks BL is increased by 1 at a timing at which the existing data is deleted. Thus, the recording instance count for the block BL at the physical address "00F2" that is moved to the usable area UA is maintained at N+4 rather than being increased due to the copying.

Next, the controller 55 designates the block BL at the physical address "00F2" as a block of the usable area UA and designates the block BL at the physical address "00AB" as a block of the spare area SA (sections (B) and (C) in FIG. 11). The controller 55 also changes the physical address allocated to logical address "0124" in the address allocation table TA from "00AB" to "00F2" (FIG. 12). This allows the block BL at the physical address "00F2" to be accessed when the logical address "0124" is designated from the information processing device 3.

Even if the logical addresses and the physical addresses are associated as described above after the second wear-leveling process, the information processing device 3 can suitably access data before and after the second wear-leveling process because the data in the block BL (physical address: 00AB) allocated to the logical address "0124"

before the second wear-leveling process is recorded in the block BL at the physical address "00F2."

The controller 55 subsequently deletes the data in the block BL at physical address "00AB." Due to this deletion, the recording instance count for the block BL at the physical address "00AB" is increased by 1 to reach N+1. As a result, the highest value of the recording instance counts for the blocks BL included in the usable area UA remains at N+99, and the lowest value of the recording instance counts for all of the plurality of blocks becomes N+1. Specifically, the data recording maldistribution degree becomes 98. In this case, if data is not recorded two times in the block BL (physical address: 0001) having the highest recording instance count included in the usable area UA, the first wear-leveling process will not be executed. Specifically, even if video is recorded one time, the first wear-leveling process will not be executed.

Figure 14:
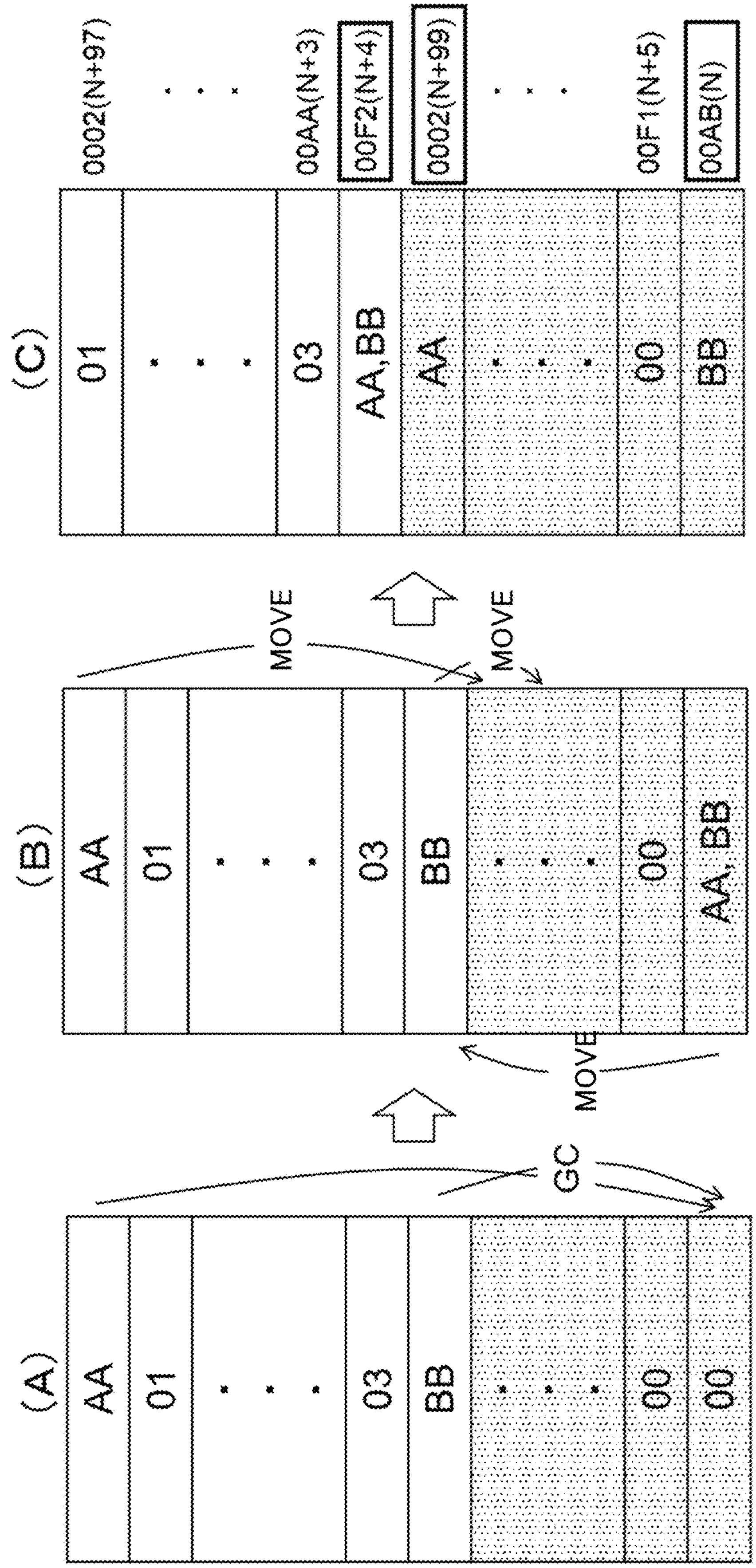
FIG. 14 is a diagram showing another example of the transition in the state of the recording area due to the second wear-leveling process.

Additionally, the second wear-leveling process can be executed through garbage collection (GC) as well. A second wear-leveling process in which garbage collection is used is described below using FIGS. 13 to 15. FIG. 13 is a diagram showing another example of the address allocation table TA before the second wear-leveling process. FIG. 14 is a diagram showing another example of the transition in the state of the recording area RA due to the second wear-leveling process. FIG. 15 is a diagram showing another example of the address allocation table TA after the second wear-leveling process.

In the description below, the address allocation table TA is configured as shown in FIG. 13. Specifically, the physical addresses "0001" and "00AB" are allocated to the logical address "0001."

First, the controller 55 of the storage 5 copies (performs garbage collection of) the data in the block BL (physical address: 0001) having the highest recording instance count within the usable area UA and the data in the block BL (physical address: 00AB) having the lowest recording instance count within the usable area UA to the block BL (physical address: 00F2) having the lowest recording instance count within the spare area SA (FIG. 9, section (A) in FIG. 14).

Next, the controller 55 designates the block BL (physical address: 00F2) to which the data was copied as a block of the usable area UA. The controller 55 also designates the block BL (physical address: 0001) having the highest recording instance count within the usable area UA and the block BL (physical address: 00AB) having the lowest recording instance count within the usable area UA as blocks of the spare area SA (sections (B) and (C) in FIG. 14). The controller 55 also changes the physical address allocated to the logical address "0001" in the address allocation table TA to "00F2" (FIG. 15).

In the aforementioned second wear-leveling process in which garbage collection is used, the highest value of the recording instance counts for the blocks BL included in the usable area UA is N+97, and the lowest value of the recording instance counts for all of the plurality of blocks BL remains as N. Specifically, the data recording maldistribution degree is 97. In this case, if data is not recorded three times in the block BL (physical address: 0002) having the highest recording instance count included in the usable area UA, the first wear-leveling process will not be executed. Specifically, even if video is recorded one time, the first wear-leveling process will not be executed.

The block BL (physical address: 0001) having the highest value (N+99) of the recording instance counts for all of the plurality of blocks is present in the spare area SA. Therefore, data is not recorded in this block BL, and the recording instance count for this block BL is kept at N+99.

The aforementioned second wear-leveling process performed through switching of the blocks BL and the second wear-leveling process in which garbage collection is used may be executed in combination.

[5. Variation 1]

Figure 16:
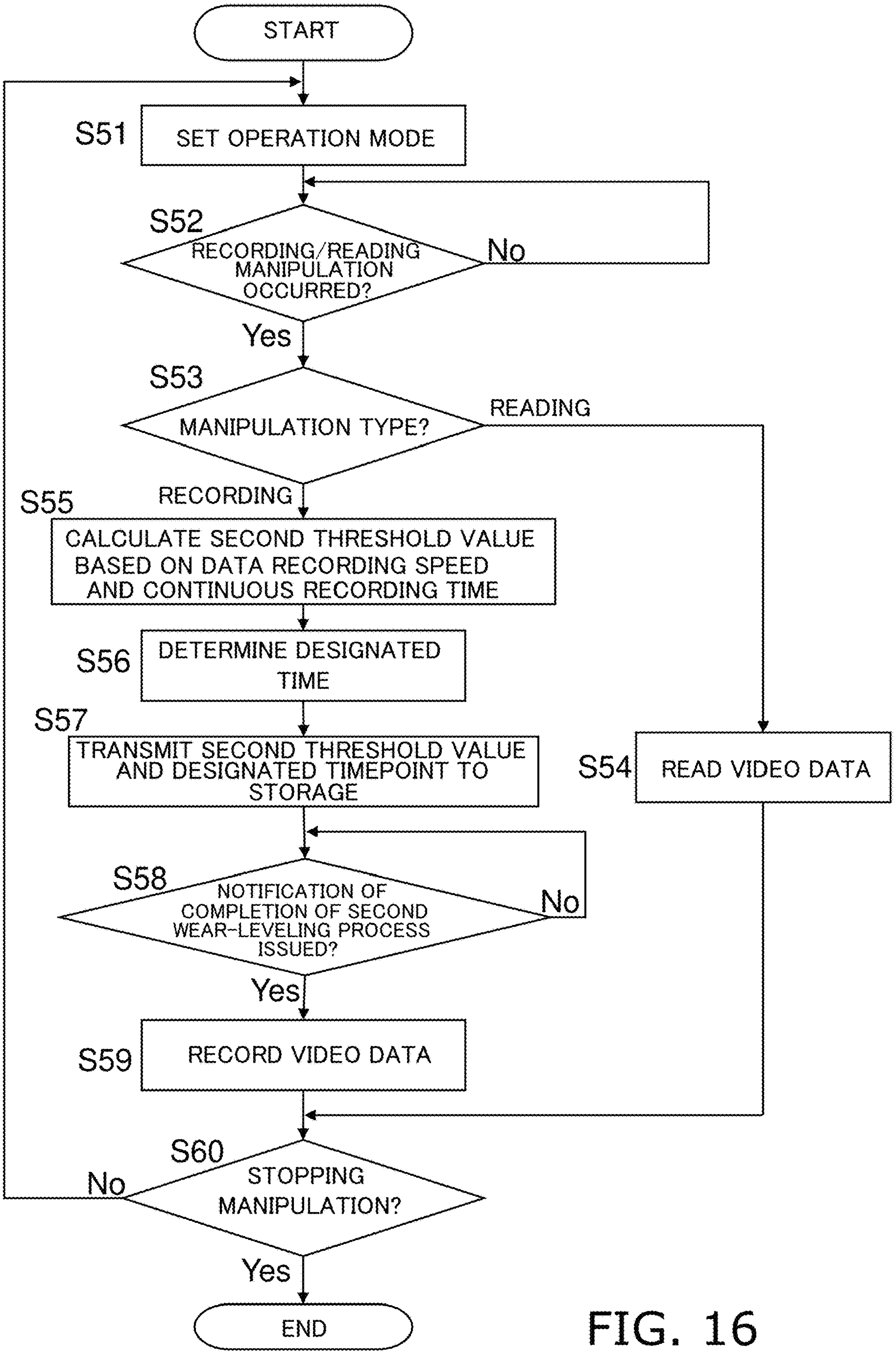
FIG. 16 is a flowchart showing an operation of the information processing device in variation 1.
Figure 17:
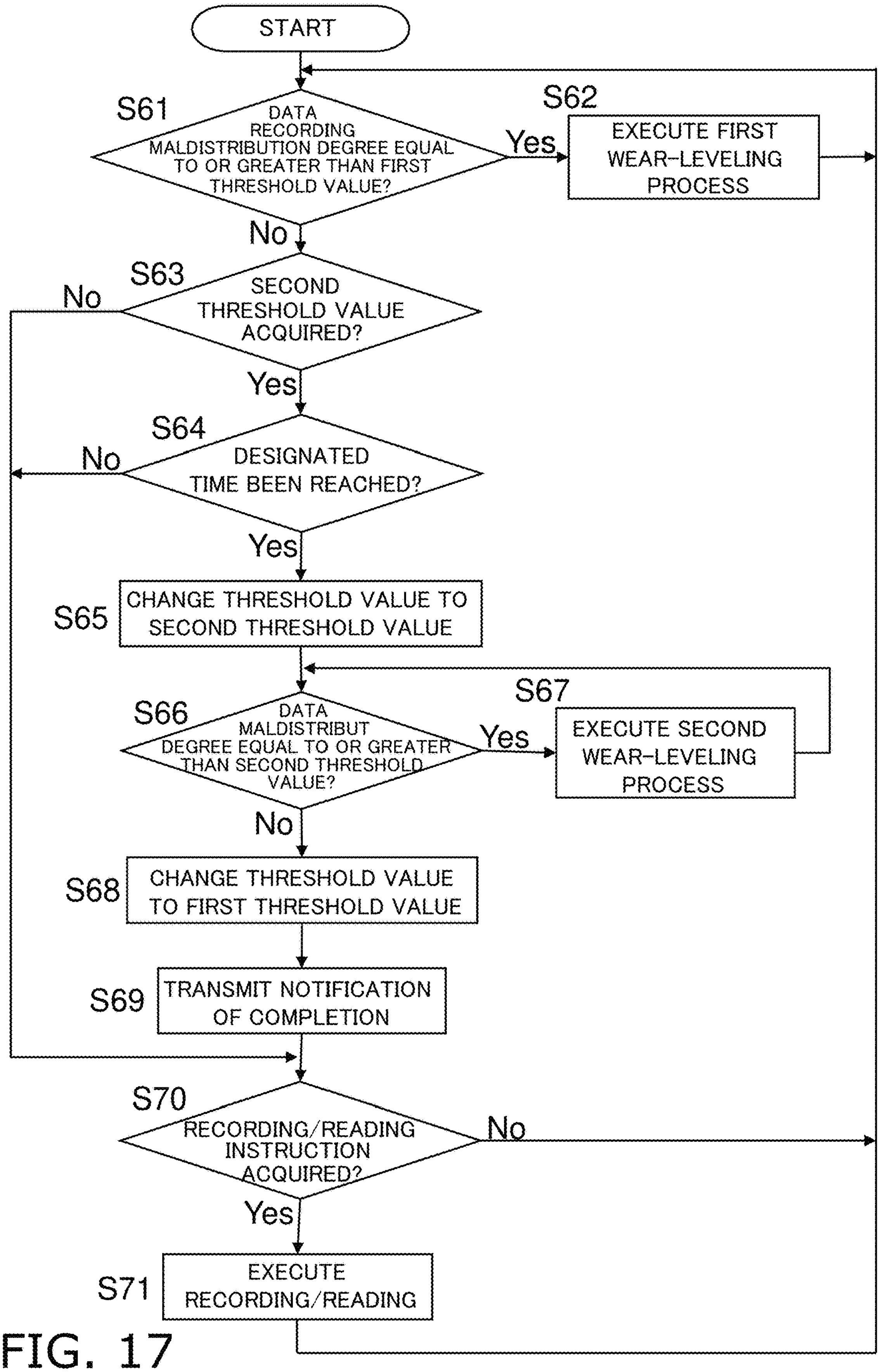
FIG. 17 is a flowchart showing an operation of the storage in variation 1.
Figure 18:
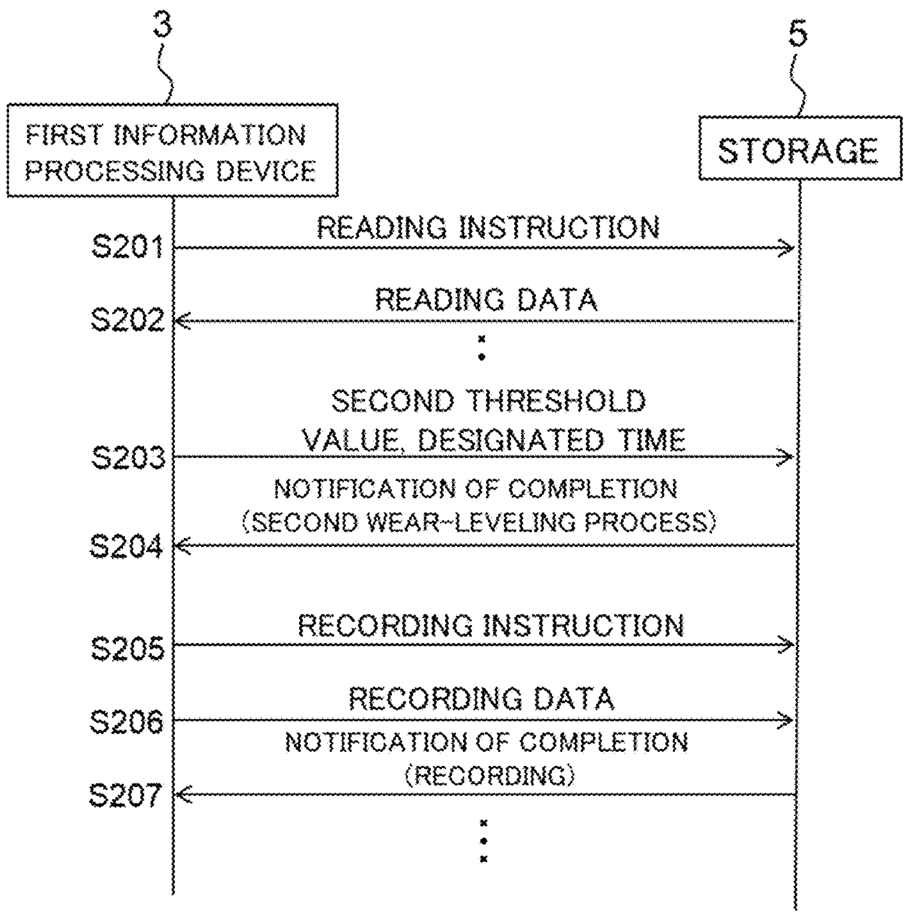
FIG. 18 is a diagram showing transmission/reception of signals in variation 1.

In variation 1 described below, the second wear-leveling process can be executed by designating a free time in which video is not recorded to the flash memory 53. The operations of the video recording system 100 in this case is described using FIGS. 16 to 18. FIG. 16 is a flowchart showing an operation of the information processing device 3 in variation 1. FIG. 17 is a flowchart showing an operation of the storage 5 in variation 1. FIG. 18 is a diagram showing transmission/reception of signals in variation 1.

When the second threshold value is calculated (step S55), the information processing device 3 determines a designated time in which to execute the second wear-leveling process (step S56). For example, the CPU 31 refers to a timepoint at which recording of video is scheduled due to manipulation by the user and determines an unscheduled time band as the designated time. The CPU 31 stores the determined designated time in the RAM 33. The second threshold value and the designated time stored in the RAM 33 are then transmitted to the storage 5 (step S57, step S203).

After the controller 55 has acquired the second threshold value and the designated time ("Yes" in step S63, step S203), the second wear-leveling process is executed in the storage 5 (steps S65 to S69) at a timing at which a timepoint has reached a designated timepoint ("Yes" in step S64).

The process content in steps S51 to S55 and S58 to S60 in FIG. 16 is identical to the process content in steps S11 to S15 and S17 to S19 in FIG. 6, respectively. Therefore, the former is not described in detail. The process content in steps S61 to S63 and S65 to S71 in FIG. 17 is identical to the process content in steps S31 to S33 and S34 to S60 in FIG. 7, respectively. Therefore, the former is not described in detail. The process content in steps S201, S202, and S204 to S207 in FIG. 18 is identical to the process content in steps S101, S102, and S104 to S107 in FIG. 8, respectively. Therefore, the former is not described in detail.

Other operations in the storage 5 can be prevented from being stopped or delayed in order to execute the second wear-leveling process, by executing the second wear-leveling process using a free time in which video is not recorded to the flash memory 53.

[6. Variation 2]

Figure 19:
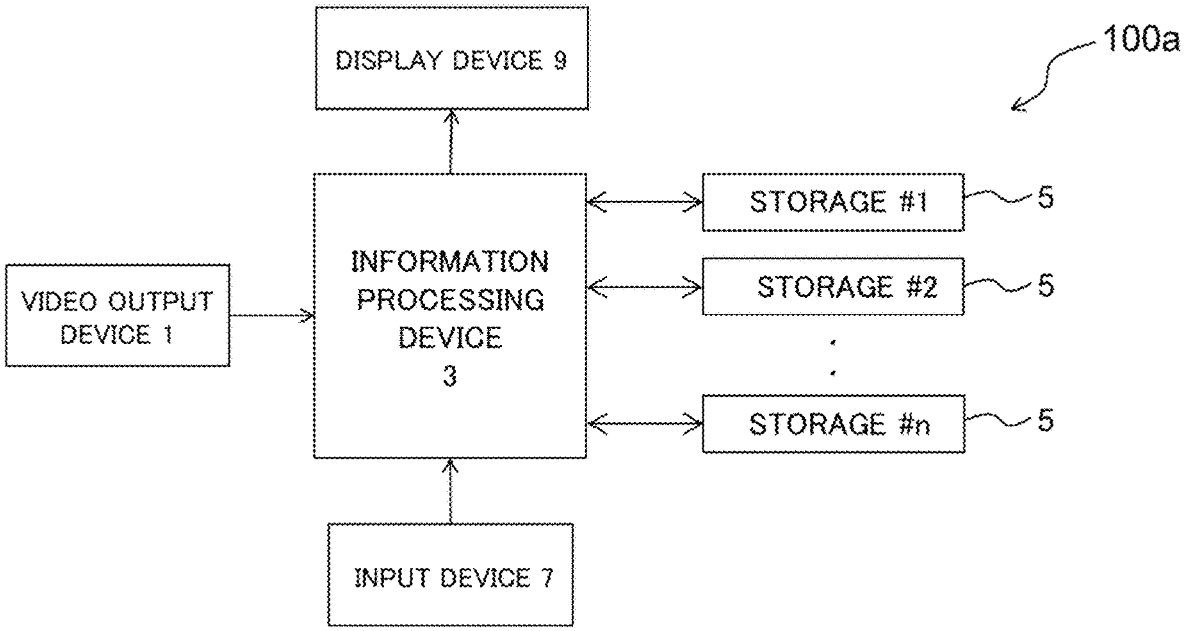
FIG. 19 is a diagram showing the configuration of the video recording system in variation 2.

In variation 2 described below, a plurality of storages 5 can be connected to an information processing device 3 in a video recording system 100*a*, as shown in FIG. 19. FIG. 19 is a diagram showing the configuration of the video recording system 100*a* in variation 2. In the example shown in FIG. 19, n storages 5 are connected to the information processing device 3.

The plurality of storages 5 in the video recording system 100*a* are formed in a striped configuration. Specifically, in the video recording system 100*a*, the plurality of storages 5 are handled as one storage having a total volume of the plurality of storages 5. Thus, a volume of video that can be recorded in the video recording system 100*a* can be increased.

In the video recording system 100*a*, each storage 5 is configured to be capable of transmitting and receiving instructions and video to and from the information processing device 3 independently of the other storages 5. Thus, each storage 5 can execute various operations in accordance with instructions received from the information processing device 3 without being limited by operations in the other storages 5.

For example, the information processing device 3 can transmit a second threshold value to each of the storages 5 in different time bands, thereby causing each storage 5 to execute a second wear-leveling process in a time band different from that of the other storages 5. Thus, while the second wear-leveling process is being executed in one storage 5, video reading/recording and other operations can be executed in the other storages 5. As a result, an application efficiency of the plurality of storages 5 improves, and the speed of the video recording system 100*a* therefore increases.

When the second wear-leveling process is executed in the storages 5, video expected to be recorded in the storages 5 is recorded in a RAM 33 of the information processing device 3 until the second wear-leveling process ends. As described above, in the video recording system 100*a*, each storage 5 executes the second wear-leveling process in a different time band. Therefore, the data volume of the video collected in the RAM 33 decreases.

As a comparative example, in a case where only one instruction is transmitted to the plurality of storages 5 simultaneously, e.g., when the second threshold value is transmitted to the plurality of storages 5, the second wear-leveling process has been executed simultaneously in the plurality of storages 5. Additionally, until a notification of completion is issued from a storage 5 in which the second wear-leveling process is completed last, the other storages 5 in which the second wear-leveling process is completed could not execute operations instructed to said storages 5.

When the second wear-leveling process is executed simultaneously by the plurality of storages 5, a data volume of video collected in the RAM 33 while the second wear-leveling process is being executed reaches a data volume corresponding to that of the plurality of storages 5, said data volume being very high. Therefore, the operation of the information processing device 3 could be affected.

[7. Characteristics of the Present Disclosure]

(1) The storage according to the present disclosure is configured to record video, and comprises a flash memory and a controller. The flash memory has a recording area in which video is recorded. The controller is configured to control recording of video to the flash memory.

The recording area is divided into a plurality of blocks, which are units of data deletion. The controller executes, as a standard function of the storage, a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which video can be recorded from among the plurality of blocks and a lowest value among the recording instance counts for all of the plurality of blocks. The controller also acquires a second threshold value, which is a data recording maldistribution degree for preventing the data recording maldistribution degree from reaching the first threshold value while the video is being recorded. In a case where the data recording maldistribution degree is greater than the second threshold value, the controller executes a second wear-leveling process bringing the data recording maldistribution degree to or below the second threshold value.

In the storage according to the present disclosure, the first wear-leveling process, which is executed as a standard function of the storage, can be prevented from being executed while video is being recorded, by executing the second wear-leveling process to bring the data recording maldistribution degree to or below the second threshold value. As a result, video can be recorded in the recording area of the flash memory without interruption.

(2) In the storage according to (1), the second threshold value may be calculated based on a recording speed at which the video is recorded to the recording area and a required time that is necessary to record the video to the recording area. Thus, a suitable second threshold value that corresponds to characteristics of video to be recorded can be calculated.

(3) In the storage according to (1) or (2), the controller may execute the second wear-leveling process using a free time in which the video is not recorded to the flash memory. Thus, other operations in the storage can be prevented from being stopped or delayed in order to execute the second wear-leveling process.

(4) The storage according to any of (1) to (3) may further comprise a storage unit. In this case, the controller may execute a wear-leveling process when the data recording maldistribution degree is equal to or greater than a threshold value stored in the storage unit. Additionally, the controller may executes the second wear-leveling process by storing the acquired second threshold value in the storage unit, and may rewrite the second threshold value in the storage unit to the first threshold value after the second wear-leveling process is executed. Thus, the first wear-leveling process and the second wear-leveling process can be individually executed, using a common algorithm with which a wear-leveling process is executed when the data recording maldistribution degree is equal to or greater than a threshold value stored in the storage unit, merely by changing the threshold value in the storage unit.

(5) In the storage according to any of (1) to (4), the second threshold value may be transmitted from an information processing device that transmits video to be recorded in the recording area. Thus, the second threshold value does not have to be calculated on the storage side.

(6) The video recording system according to the present disclosure comprises a storage and an information processing device. The storage has a flash memory having a recording area in which video is recorded, and a controller that is configured to control recording of the video to the flash memory. The information processing device is connected to the storage and configured to transmit, to the storage, video to be recorded in the recording area.

In the video recording system, the recording area is divided into a plurality of blocks, which are units of data deletion. The controller executes, as a standard function of the storage, a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which video can be recorded from among the plurality of blocks and a lowest value among the recording instance counts for all of the plurality of blocks. Furthermore, the information processing device calculates a second threshold value, which is a data recording maldistribution degree for preventing the data recording maldistribution degree from reaching the first threshold value while video is being recorded. The controller acquires the second threshold value from the information processing device, and in a case where the data recording maldistribution degree is equal to or greater than the second threshold value, executes a second wear-leveling process bringing the data recording maldistribution degree to or below the second threshold value.

In the storage of the video recording system according to the present disclosure, the first wear-leveling process, which is executed as a standard function of the storage, can be prevented from being executed while video is being recorded, by executing the second wear-leveling process to bring the data recording maldistribution degree to or below the second threshold value. As a result, video can be recorded in the recording area of the flash memory without interruption. Additionally, a processing load of the controller of the storage can be reduced by calculating the second threshold value by the information processing device.

(7) In the video recording system according to (6), the information processing device may calculate the second threshold value based on a recording speed at which the video is recorded to the recording area and a required time that is necessary to record the video to the recording area. Thus, a suitable second threshold value that corresponds to characteristics of video to be recorded can be calculated.

(8) The video recording system according to (6) or (7) may be provided with a plurality of storages. In this case, the plurality of storages may be formed in a striped configuration. Additionally, each storage may be configured to transmit and receive instructions and video to and from the information processing device independently of the other storages. Thus, a volume of video that can be recorded in the video recording system can be increased. Additionally, other processes in the other storages can be executed while a process is executed in one storage. As a result, an application efficiency of the plurality of storages improves, and the speed of the video recording system therefore increases.

(9) In the video recording system according to (8), the information processing device may transmit the second threshold value to each of the storages in different time bands, to cause each storage to execute the second wear-leveling process in a time band different from that of the other storages. Thus, while the second wear-leveling process is being executed in one storage, other operations can be executed in the other storages. As a result, the application efficiency of the plurality of storages improves, and the speed of the video recording system therefore increases.

(10) The method of controlling a storage according to the present disclosure is a controlling method of a storage having a flash memory having a recording area in which video is recorded. The storage executes a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which the video can be recorded from among a plurality of blocks included in the recording area and a lowest value among the recording instance counts for all of the plurality of blocks.

The method of controlling a storage having the configuration described above comprises: acquiring a second threshold value, which is a data recording maldistribution degree for preventing the data recording maldistribution degree from reaching the first threshold value while video is being recorded; and executing, in a case where the data recording maldistribution degree is greater than the second threshold value, a second wear-leveling process bringing the data recording maldistribution degree to or below the second threshold value.

In the control method according to the present disclosure, the first wear-leveling process, which is executed as a standard function of the storage, can be prevented from being executed while video is being recorded, by executing the second wear-leveling process to bring the data recording maldistribution degree to or below the second threshold value. As a result, video can be recorded in the recording area of the flash memory without interruption.

INDUSTRIAL APPLICABILITY

The present disclosure can be applied to a storage for recording video, a video recording system for recording video in a storage, and a method for controlling a storage for recording video.

EXPLANATION OF REFERENCE NUMERALS

100, **100*a*** Video recording system
1 Video output device
3 Information processing device
31 CPU
33 RAM
35 Storage device
37 Video interface
39 I/O interface
41 Display interface
43 Storage interface
5 Storage
51 Access port
53 Flash memory
RA Recording area
SA Spare area
UA Usable area
55 Controller
57 Storage unit
CI Recording instance count information
TA Address allocation table
TH Threshold value
7 Input device
9 Display device
BL Block

The invention claimed is:

1. A storage that is configured to record video,
the storage comprising:
a flash memory having a recording area in which video is recorded; and
a controller configured to control recording of the video to the flash memory,
wherein the recording area is divided into a plurality of blocks which are units of data deletion,
the controller executes, as a standard function of the storage, a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which the video can be recorded from among the plurality of blocks and a lowest value among the recording instance counts for all of the plurality of blocks, and the controller acquires a second threshold value, which is a data recording maldistribution degree for preventing the data recording maldistribution degree from reaching the first threshold value while the video is being recorded, and in a case where the data recording maldistribution degree is greater than the second threshold value, executes a second wear-leveling process bringing the data recording maldistribution degree to or below the second threshold value.

2. The storage according to claim 1, wherein the second threshold value is calculated based on a recording speed at which the video is recorded to the recording area and a required time that is necessary to record the video to the recording area.

3. The storage according to claim 1, wherein the controller executes the second wear-leveling process using a free time in which the video is not recorded to the flash memory.

4. The storage according to claim 1, further comprising a storage unit, wherein the controller executes a wear-leveling process when the data recording maldistribution degree is equal to or greater than a threshold value stored in the storage unit, and the controller executes the second wear-leveling process by storing the acquired second threshold value in the storage unit, and rewrites the second threshold value in the storage unit to the first threshold value after the second wear-leveling process is executed.

5. The storage according to claim 1, wherein the second threshold value is transmitted from an information processing device that transmits video to be recorded in the recording area.

6. A video recording system comprising:

a storage having a flash memory having a recording area in which video is recorded, and a controller configured to control recording of the video to the flash memory; and an information processing device connected to the storage, and configured to transmit, to the storage, video to be recorded in the recording area, wherein the recording area is divided into a plurality of blocks, which are units of data deletion, the controller executes, as a standard function of the storage, a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which the video can be recorded from among the plurality of blocks and a lowest value among the recording instance counts for all of the plurality of blocks, the information processing device calculates a second threshold value, which is a data recording maldistribution degree for preventing the data recording maldistribution degree from reaching the first threshold value while the video is being recorded, and the controller acquires the second threshold value from the information processing device, and in a case where the data recording maldistribution degree is equal to or greater than the second threshold value, executes a second wear-leveling process bringing the data recording maldistribution degree to or below the second threshold value.

7. The video recording system according to claim 6, wherein the information processing device calculates the second threshold value based on a recording speed at which the video is recorded to the recording area and a required time that is necessary to record the video to the recording area.

8. The video recording system according to claim 6, wherein a plurality of storages are provided, the plurality of storages are formed in a striped configuration, and each storage is configured to transmit and receive instructions and video to and from the information processing device independently of the other storages.

9. The video recording system according to claim 8, wherein the information processing device transmits the second threshold value to each of the storages in different time bands, to cause each storage to execute the second wear-leveling process in a time band different from that of the other storages.

10. A method of controlling a storage having a flash memory having a recording area in which video is recorded, the storage executing a first wear-leveling process in a case where a data recording maldistribution degree has reached or exceeded a first threshold value, the first wear-leveling process bringing the data recording maldistribution degree below the first threshold value, the data recording maldistribution degree being expressed as a difference between a highest value of data recording instance counts for blocks to which the video can be recorded from among a plurality of blocks included in the recording area and a lowest value among the recording instance counts for all of the plurality of blocks, the control method comprising:

acquiring a second threshold value, which is a data recording maldistribution degree for preventing the data recording maldistribution degree from reaching the first threshold value while the video is being recorded; and executing, in a case where the data recording maldistribution degree is greater than the second threshold value, a second wear-leveling process bringing the data recording maldistribution degree to or below the second threshold value.

* * * * *